(No Model.)
A. STRAUS.
ELASTIC WHEEL TIRE.
No. 453,520. Patented June 2, 1891.
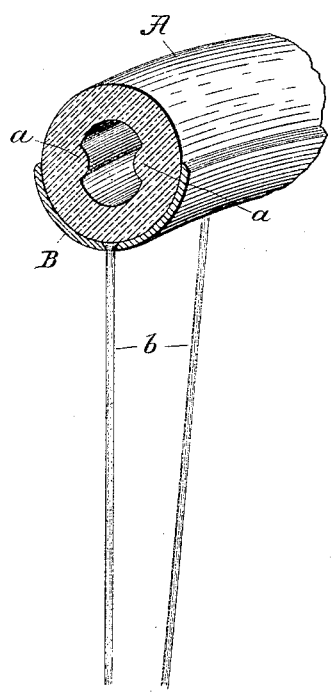

UNITED STATES PATENT OFFICE.

ALEXANDER STRAUS, OF NEW YORK, N. Y., ASSIGNOR TO THE NEW YORK BELTING AND PACKING COMPANY, LIMITED, OF SAME PLACE.

ELASTIC WHEEL-TIRE.

SPECIFICATION forming part of Letters Patent No. 453,520, dated June 2, 1891.

Application filed March 31, 1891. Serial No. 387,189. (No model.)

*To all whom it may concern:*

Be it known that I, ALEXANDER STRAUS, a resident of New York city, county and State of New York, have invented a new and useful Improvement in Cushion-Tires, which improvement is fully set forth in the following specification.

The present invention has reference to an improvement in rubber tires for bicycles and other vehicles, and more particularly to that class known as "cushion-tires," which are molded with an inner hollow space, serving as an air-cushion, the utility of which is well understood. It has been found heretofore in the employment of such tires that constant compression of the same when in use causes the tire to flatten, the inner surface assuming an acute angle, in consequence of which the rubber cracks from the inside and the tire loses its elasticity and tends to assume permanently the flattened shape.

The object of my invention is to prevent the cracking of rubber tires from the interior, and this is effected by molding on the inner surface two ribs or re-enforcements on opposite sides and along the lines where the compression usually causes the cracks to occur.

The invention will be more fully understood from the following description, reference being had to the accompanying drawing, which forms part of this specification, and shows one form of my improved tire in perspective and cross-section.

In accordance with my invention I provide the two ribs or re-enforcements *a a* on the inner opposite sides of the tire A, formed integral therewith and extending the whole length of the tire.

B represents the felly, and *b* the wire spokes.

In the use of the improved tire the position of these ribs prevents the bending of the tire along the lines where the greatest compression occurs, distributing the effect above and below these lines, at the most the inner surface will not at any point be bent greatly out of its original form. These re-enforcements, moreover, serve to stiffen the tire along the sides, where the greatest strain occurs, and thus increase the elasticity as well as the durability of the article. Since the improved tire cannot flatten when in use so much as that of the ordinary construction, wear is reduced by reason of the smaller surface in contact with the ground, and since it does not spread so much in flattening it is less exposed to cutting from the edge of the felly. I have shown the re-enforcing ribs as semi-elliptical in cross-section, but it is obvious that they may be of other suitable configuration.

The tire is molded in the usual manner of making cushion-tires—that is to say, it is formed in what is known as a "tubing-machine," a sufficient quantity of water being injected into the hollow space before the same is spliced. It is then put into molds and vulcanized under heat and pressure.

I claim as my invention—

1. A cushion-tire for bicycles and other vehicles, having the opposite inner sides or walls re-enforced or thickened, substantially as and for the purposes described.

2. A hollow tire provided with ribs or re-enforcements on opposite sides of the inner surface, substantially as described.

In testimony whereof I have signed this specification in the presence of two subscribing witnesses.

ALEXANDER STRAUS.

Witnesses:
VICTOR E. BURKE,
JAMES H. COBB.